Jan. 22, 1963

D. W. CASEY II, ET AL 3,075,140

ATTENUATOR CIRCUIT

Filed April 13, 1959

Inventors:
Dwight W. Casey II,
Sidney J. Worley,
Harley R. Meadows,
by Gust & Irish
Attorneys.

3,075,140

ATTENUATOR CIRCUIT

Dwight W. Casey II and Sidney J. Worley, Fort Wayne, Ind., and Harley R. Meadows, Baltimore, Md., assignors to International Telephone and Telegraph Corporation Filed Apr. 13, 1959, Ser. No. 806,078
6 Claims. (Cl. 323—66)

Figures 1, 2:
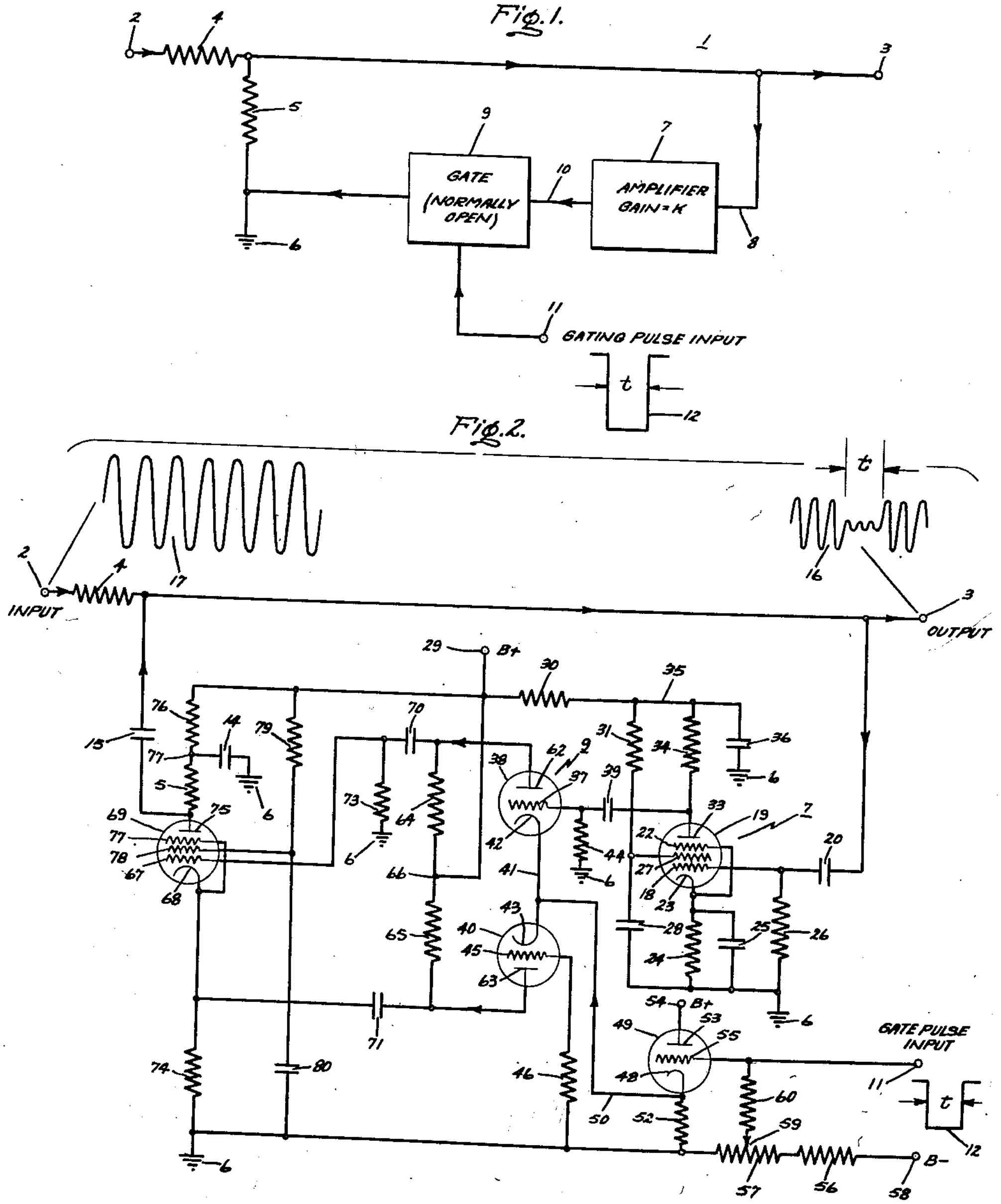

This invention relates generally to signal attenuating circuits, and more particularly to pulse-controlled attenuators of the type in which a predetermined amount of attenuation is inserted in a signal circuit responsive to a control pulse.

There are instances in the design of electronic circuitry when it is desirable to insert a predetermined amount of attenuation in a signal circuit for a predetermined period of time. Several types of attenuators are presently in existence, the two most common forms known to the present applicants being those which employ pulsed gain control of remote cut-off vacuum tubes, and those which employ amplifiers with diode-type feedback with the amount of feedback being dependent upon the signal level; both of these types of attenuators in general introduce a large amount of non-linearity into the signals being attenuated. It is therefore desirable to provide a pulse-controlled attenuator which introduces a minimum of non-linearities into the signal path and further which provides a minimum of gating pedestal, drift and gating transients. It is further desirable that the signal path of such a circuit consist only of passive components so that non-linearities are not introduced.

It is therefore an object of this invention to provide an improved signal attenuator circuit.

Another object of this invention is to provide an improved pulse-controlled attenuator circuit in which attenuation is introduced with a minimum of non-linear distortion to the signal.

A further object of this invention is to provide an improved pulse-controlled attenuator circuit which does not introduce non-linearities into the signal path and which provides a minimum gating pedestal drift and gating transients.

A still further object of this invention is to provide an improved attenuator circuit in which only passive components are provided in the signal path.

Our invention in its broader aspects therefore provides a signal circuit having passive impedance means therein so that a signal impressed on the signal circuit normally receives a first predetermined attenuation. A feed-back loop is provided selectively coupled to the signal circuit and including amplifying means having a predetermined gain so that additional attenuation proportional to the amplifier gain is inserted in the signal circuit. More particularly, we provide gating means for coupling the amplifier in a feed-back loop with the signal circuit responsive to external gating pulses. It is thus seen that the active components of the circuit are in the feed-back path and thus there are no non-linearities introduced in the signals in the signal circuit when the feed-back loop is not active, and that a minimum of non-linearities are introduced during attenuation. Pulse control of the feed-back loop further tends to minimize gating pedestal drift and gating transients which are introduced during the gating period.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a block diagram schematically illustrating the improved attenuator circuit of our invention; and FIG. 2 is a schematic diagram illustrating a specific attenuator circuit incorporating our invention.

Referring now to FIG. 1, with reference to which the general principles of our invention will be explained, our attenuator circuit, generally identified as 1, comprises signal input and output terminals 2 and 3 with resistor 4 directly serially connected between the input and output terminals 2 and 3 and with another resistor 5 connected between output terminal 3 and a source of reference potential, such as ground 6. It will now be readily seen that in the event the values of resistances 4 and 5 are the same, the input-to-output gain of the system thus far described is one-half, the input signal applied to the input terminal 2 having its amplitude cut in half by virtue of the equality of the resistances 4 and 5; the system thus far described therefore provides a normal attenuation of six db.

In accordance with our invention, we provide an amplifier 7 having its input circuit 8 connected to output terminal 3 and a gate circuit 9 connecting the output circuit 10 of amplifier 7 to the resistance 5. Gate circuit 9, which is normally open, is provided with a gating pulse input circuit 11 adapted to be connected to a source of gating pulses 12 having a duration "$t$." It will now be seen that when a gating pulse 12 is impressed upon gate circuit 9, the gate circuit 9 is closed, i.e., conducting, thereby to connect the output circuit 10 of amplifier 7 to the resistance 5 and it will now be seen that a feed-back path is completed between the output terminal 3 and the resistance 5. It will now be seen that the input-to-output gain with the gate circuit 9 conducting responsive to gating pulse 12 is $$\frac{e_o}{e_{in}}=\frac{1}{2(1+K)}$$

where K is the gain of the amplifier 7. It will further be seen that instances in which the gain K of amplifier 7 is large, the input-to-output gain of the system with the gate circuit 9 conducting will be substantially $$\frac{1}{2K}$$

It is thus apparent that the attenuation change from the condition in which the gate circuit 9 is open to the condition in which the gate circuit 9 is closed is equal, under these conditions, to $$\frac{1}{K}$$

Referring now to FIG. 2 in which like elements are indicated by like reference numerals, it will be seen that resistor 4 is again serially directly connected between input and output terminals 2 and 3, however, in this specific embodiment, the shunt resistor 5 is coupled to ground 6 by a coupling capacitor 14 and to the output terminal 3 by another coupling capacitor 15. It will be noted that again, except during the gating period "$t$," and with resistors 4 and 5 having equal resistance values, the amplitude of the output signal 16 appearing in the output terminal 3 will be one-half as large as the amplitude of the input signal 17 applied to the input terminal 2 by virtue of the equal voltage division of the input signal 17 across the resistor elements 4 and 5. Thus, when the gate circuit 9 is open, i.e., not conducting, so that the feed-back path is open, the output signal 16 will be exactly one-half the input signal 17.

In accordance with our invention, the normal output signal 16 (reduced by one-half from the input signal 17) is applied to control grid 18 of pentode 19 of amplifier 7 by means of coupling capacitor 20. Pentode amplifier 7 in the specific embodiment of FIG. 2 essentially supplies the gain K defined in the general theory of operation of our invention as described above. The suppressor grid 22 of pentode 19 is directly connected to cathode 23, either internally or externally as is well known in the art, cathode 23 being connected to ground 6 by means of cathode resistor 24 with capacitor 25 connected thereacross; bias for pentode 19 is supplied by cathode biasing resistor 24 with control grid 18 being referenced to ground by a suitable resistor 26 connected as shown. Screen grid 27 of pentode 19 is connected to ground 6 by means of capacitor 28 and to a source 29 of positive potential, such as +150 volts, by resistors 30 and 31. Plate 33 of pentode 19 is also connected to a source 29 of positive potential by resistors 34 and 30, the midpoint 35 between resistors 31 and 34 being connected to ground 6 by a capacitor 36.

The output signal at the plate 33 of pentode 19 of amplifier 7 (K times the signal 16 applied to control grid 18) is fed to control grid 37 of triode 38 of gate circuit 9 by means of coupling capacitor 39. Triodes 38 and 40 and their associated circuitry to be hereinafter described form the two halves of a push-pull type gate amplifier having a single-ended input and a push-pull output. Thus, the cathodes 42 and 43 of triodes 38 and 40 are connected together as shown, the control grid 37 of triode 38 being connected to ground 6 by a resistor 44 and the control grid 45 of triode 40 being likewise connected to ground 6 by resistor 46; resistor 46 is of such value as to equalize the loads seen by the grids 37 and 45 of the gate circuit triodes 38 and 40.

The gate amplifier circuit 9 comprising triodes 38 and 40 is normally in the cut-off condition, this cut-off condition being maintained by returning the common connection 41 between cathodes 42 and 43 of triodes 38 and 40 to cathode 48 of gate-initiating triode 49 by connection 50, as shown. Cathode 48 of gate-initiating tube 49 is connected to ground 6 by a suitable cathode resistor 52 with its plate 53 being connected to a suitable source 54 of positive plate potential, such as +150 volts. Control grid 55 is directly connected to the gate pulse input terminal 11. A fixed bias sufficient to maintain gate initiating tube 49 normally conducting is provided by means of resistor 56 and potentiometer 57 serially connected between ground 6 and a suitable source 58 of negative potential, such as −150 volts with potentiometer 57 having its sliding element 59 connected to control grid 55 of gate-initiating tube 49 by resistor 60.

With the gate-initiating tube 49 normally conducting by virtue of its fixed grid bias, the voltage drop across its cathode resistor 52 will be sufficient so that the cathodes 42 and 43 of the gate amplifier tubes 38 and 40 will likewise be at a sufficiently positive potential to maintain gate amplifier tubes 38 and 40 well beyond cut-off. However, when a suitable negative-going gating pulse 12 is impressed upon gate pulse input terminal 11 and control grid 55 of gate-initiating tube 49, tube 49 is cut-off, thus allowing the potential of its cathode 48 to decrease essentially to that of ground 6. Under these circumstances, the potentials of cathodes 42 and 43 of gate tubes 38 and 40 likewise simultaneously and equally decrease causing gate tubes 38 and 40 to be gated on, i.e., to conduct; when tubes 38 and 40 are thus gated on and during the gating interval "t," their respective plate voltages decrease equally to a predetermined level, this decrease in voltage level amounting to equal in phase gating pedestals on each of the plates 62 and 63 of gate tubes 38 and 40. The gating transients also associated with these gating pedestals likewise tend to be equal.

A voltage divider comprising serially connected resistors 64 and 65 is connected across plates 62 and 63 of gating tubes 38 and 40 with its midpoint 66 connected to the source 29 of positive plate potential, as shown. It will now be seen that during the gating interval "t" with gating tubes 38 and 40 turned on, the signal 16 impressed upon amplifier 7 will appear amplified by the gain K of amplifier 7 and any gain in the gate amplifier 9, as push-pull output signals on the plates 62 and 63 of the gate tubes 38 and 40. These push-pull gate amplifier output signals which appear at plates 62 and 63 of gate tubes 38 and 40 are fed to grid 67 and cathode 68 of pentode-type reverter tube 69 by means of coupling capacitors 70 and 71 respectively; pentode-type reverter tube 69 preferably has a gain of approximately unity. Grid 67 of tube 69 is also connected to ground 6 by resistor 73 having a value chosen such that the loads seen by the plates 62 and 63 of gate tubes 38 and 40 are approximately equalized. Cathode 68 of reverter tube 69 is connected to ground 6 by a suitable cathode resistor 74 with its plate 75 being connected to the source 29 of positive plate potential by means of resistors 5 and 76 connected in series. It will be observed that the coupling capacitor 14 is connected to the midpoint 77 between resistors 5 and 76 and that resistor 5 and coupling capacitor 15 likewise are connected to plate 75 of reverter tube 69. In accordance with conventional practice, suppressor grid 77 of pentode reverter tube 69 is directly connected, either internally or externally to cathode 68 and screen grid 78 is connected to the positive source of plate potential 29 by a suitable resistor 79 and to ground 6 by a suitable capacitor 80.

It will now be seen that the reverter tube 69 and its associated components provide a single-ended output for the push-pull gate circuit 9, this output being the difference of the push-pull inputs thereto which appeared on the plates 62 and 63 of the gating tubes 38 and 40. It will now be seen that the signals passed by the gating amplifier 9 during the gating interval "t," being push-pull in nature, are out of phase, and thus add directly in the reverter tube 69. However, it will be seen that the gating pedestals and transients appearing on plates 62 and 63 of gating tubes 38 and 40 are equal and in phase and thus tend to be cancelled in the reverter tube 69. Furthermore, residual pedestal drift and gating transients are further reduced by the amount of gain K of amplifier 7 during closed loop operation.

It will now further be seen that during the gating interval "t," when gate amplifier circuit 9 is conducting, the output signal of reverter tube 69 appearing at its plate 75 is added to that portion of the input signal 17 appearing across resistor 5 thus inserting an additional apparent attenuation to the input signal of approximately $$\frac{1}{K}$$

(assuming that the gain K of amplifier 7 is large).

It will now be readily understood that when the push-pull gate amplifier 9 is non-conducting so that the feedback path is open, all of the active components are out of the circuit with the only component in the signal circuit being the resistor 4 which, being passive, cannot introduce non-linearities or distortion to the signal. Furthermore, it will be seen that linear active circuitry is provided in the feed-back path, and this fact, combined with the feed-back action itself provides substantially linear attenuation to the signals. At the same time it is seen that the feed-back loop provides reduction to gating pedestals and transients.

It will further be observed that the amount of attenuation provided in accordance with our invention may be linearly varied by providing additional feed-back loops in parallel, each loop having its own gate and being closed as a function of the desired attenuation. It will also be observed that the circuit of our invention will function, with a sufficient gain K in amplifier 7, essentially as a gate circuit, such gating being accomplished substantially without gating pedestals or gating transients.

In a specific circuit constructed in accordance with

FIG. 2, the illustrated components had the following values:

| | | |
|---|---|---|
| Resistor **4** | ohms | 180 |
| Resistor **5** | do | 180 |
| Capacitor **14** | microfarads | 4 |
| Capacitor **15** | do | 0.1 |
| Tube **19** | | 5840 |
| Capacitor **20** | microfarads | 0.01 |
| Resistor **24** | ohms | 150 |
| Capacitor **25** | microfarads | 0.5 |
| Resistor **26** | ohms | 270,000 |
| Capacitor **28** | microfarads | 0.1 |
| Resistor **30** | ohms | 150 |
| Resistor **31** | do | 24,000 |
| Resistor **34** | do | 6,200 |
| Capacitor **36** | microfarads | 4 |
| Tube **38** | | ½-6021 |
| Capacitor **39** | microfarads | 0.01 |
| Tube **40** | | ½-6021 |
| Resistor **44** | ohms | 100,000 |
| Resistor **46** | do | 6,200 |
| Tube **49** | | ½-6111 |
| Resistor **52** | ohms | 430 |
| Resistor **56** | megohms | 1 |
| Potentiometer **57** | ohms | 100,000 |
| Resistor **60** | megohms | 1 |
| Resistor **64** | ohms | 2,200 |
| Resistor **65** | do | 2,200 |
| Tube **69** | | 5840 |
| Capacitor **70** | microfarads | 4 |
| Capacitor **71** | do | 4 |
| Resistor **73** | ohms | 91 |
| Resistor **74** | do | 150 |
| Resistor **76** | do | 4,300 |
| Resistor **79** | do | 22,000 |
| Capacitor **80** | microfarads | 0.1 |

It will be readily understood that the specific circuit components shown in FIG. 2 are by way of illustration only. For example, other forms of amplifiers may readily be employed in place of the specific pentode amplifier 7 and other forms of gate amplifiers 9 may be used in place of the specific push-pull gate amplifier shown. Likewise, the specific reverter tube 69 is replaceable by various forms of differential devices and amplifiers.

It will now be readily seen that we have provided an improved attenuator circuit of the pulse-controlled type in which pulsed type attenuation is provided without the use of an attenuator device in the signal or forward path system. Furthermore, our improved attenuator system corrects for its own gating pedestal drift and tends to reduce gating transients. Furthermore, as indicated, the signal path consists only of passive components which cannot induce non-linearities. It will also be seen that our improved attenuator circuit may be utilized as a gain control by maintaining the gate circuit 9 normally closed by the application of a constant negative control signal thereon, the gate being opened responsive to removal of the control signal thereby to increase the circuit gain.

While we have described above the principles of our invention in connection with specific apparatus, it is to be clearly understood that this description is made only by way of example and not as a limitation to the scope of our invention.

What is claimed is:

1. In an attenuator circuit; a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain; second amplifier means having a control circuit and a load circuit including said second fixed impedance means but excluding said first fixed impedance means; and gating means for coupling said first amplifier means in a feedback loop between said output terminal and said control circuit of said second amplifier means responsive to a control signal whereby additional attenuation proportional to said first amplifier means gain is inserted in said signal circuit responsive to said control signal.

2. In an attenuator circuit: a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain with its input circuit coupled to said output terminal; second amplifier means having a control circuit and a load circuit including said second fixed impedance means but excluding said first fixed impedance means and gating means responsive to an external control pulse coupling the output circuit of said amplifier to said control circuit of said second amplifier means whereby said first amplifier means is coupled in a feed-back loop with said signal circuit responsive to a said control pulse thereby inserting additional attenuation proportional to said first amplifier means gain in said signal circuit.

3. In an attenuator circuit: a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain with its input circuit coupled to said output terminal; and gating amplifier means having its signal input circuit coupled to the output circuit of said first amplifier means and having its output circuit coupled to said second impedance means, said gating amplifier means having a gating pulse input circuit adapted to be connected to a source of gating pulses, said gating amplifier means connecting said first amplifier means in a feed-back loop with said signal circuit responsive to a said gating pulse thereby inserting additional attenuation in said signal circuit proportional to said first amplifier means gain.

4. In an attenuator circuit: a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain with its input circuit coupled to said output terminal; push-pull gate amplifier means having its signal input circuit coupled to the output circuit of said first amplifier means; and differential means coupling the output circuit of said push-pull gate amplifier means to said second impedance means; said push-pull gate amplifier means having a gate pulse input circuit adapted to be connected to a source of gating pulses, said gating amplifier means connecting said first amplifier means in a feed-back loop with said signal circuit responsive to a said gating pulse thereby inserting additional attenuation in said signal circuit proportional to said first amplifier means gain.

5. In an attenuator circuit: a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain with its input circuit coupled to said output terminal; push-pull gate amplifier means having a single-ended input circuit coupled to the output circuit of said first amplifier means; differential amplifier means having its input circuits connected respectively to the push-pull output circuits of said push-pull gate amplifier means, said differential amplifier means having its output circuit coupled to said second impedance means; said gate amplifier means having a gate pulse input circuit for gating on the same responsive to a gate pulse thereby connecting said first amplifier means in a feed-back loop with said signal circuit whereby additional attenuation proportional to the gain of said first amplifier means is inserted therein.

6. In an attenuator circuit: a signal circuit comprising signal input and output terminals, first fixed impedance means serially connected between said terminals, and second fixed impedance means coupled in shunt with said output terminal and a source of reference potential whereby a signal impressed upon said input terminal normally receives a first predetermined attenuation; first amplifier means having a predetermined gain with its input circuit coupled to said output terminal; push-pull gate amplifier means including a pair of valve devices with a single-ended signal input circuit coupled to the output circuit of said first amplifier means and with a push-pull output circuit; means including a reverter tube having cathode and control grid elements connected respectively to said push-pull output circuit of said gate amplifier means and having its plate element connected to said second impedance on the side thereof adjacent said output terminal; said gate amplifier means having a gate pulse input circuit coupled to said pair of valve devices simultaneously and equally to gate the same on responsive to a gate pulse thereby connecting said first amplifier means in a feed-back loop with said signal circuit whereby additional attenuation proportional to the gain of said first amplifier means is inserted therein.

References Cited in the file of this patent

UNITED STATES PATENTS

| | | |
|---|---|---|
| 2,247,468 | Barr et al. | July 1, 1941 |
| 2,497,918 | Taylor | Feb. 21, 1950 |
| 2,540,817 | Forster | Feb. 6, 1951 |
| 2,777,018 | Russell | Jan. 8, 1957 |
| 2,797,383 | Wolf | June 25, 1957 |